US012170813B2

(12) United States Patent
Li et al.

(10) Patent No.: US 12,170,813 B2
(45) Date of Patent: *Dec. 17, 2024

(54) CHANNEL REPORTING DURING FAST CHANNEL CHANGE (71) Applicant: ARRIS Enterprises LLC, Suwanee, GA (US)

(72) Inventors: Feng Li, Shenzhen (CN); YuPing Dong, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,530

(22) Filed: Jan. 25, 2022

(65) Prior Publication Data
US 2022/0150577 A1 May 12, 2022

Related U.S. Application Data (63) Continuation of application No. 16/826,620, filed on Mar. 23, 2020, now Pat. No. 11,265,596.

(60) Provisional application No. 62/822,007, filed on Mar. 21, 2019.

(51) Int. Cl.
H04L 12/66         (2006.01)
H04N 21/438        (2011.01)
H04N 21/61         (2011.01)
H04N 21/6405       (2011.01)
H04N 21/643        (2011.01)
H04N 21/845        (2011.01)

(52) U.S. Cl.
CPC ......... *H04N 21/4384* (2013.01); *H04L 12/66* (2013.01); *H04N 21/6118* (2013.01); *H04N 21/6405* (2013.01); *H04N 21/643* (2013.01); *H04N 21/8456* (2013.01)

(58) Field of Classification Search
CPC ............. H04N 21/437; H04N 21/4384; H04N 21/6118; H04N 21/6405; H04N 21/643; H04N 21/64322; H04N 21/6581; H04N 21/8456; H04L 12/66; H04L 45/16
See application file for complete search history.

(56) References Cited

U.S. PATENT DOCUMENTS

2012/0304236 A1* 11/2012 Qiu ...................... H04N 21/222
                                                              725/109
2016/0044036 A1*  2/2016 Bestermann .......... H04L 63/101
                                                                726/4
2018/0198733 A1*  7/2018 Morgan ................ H04L 41/147

* cited by examiner

Primary Examiner — Rong Le
(74) Attorney, Agent, or Firm — Wenderoth, Lind & Ponack, L.L.P.

(57) ABSTRACT

Methods, systems, and computer readable media described herein can be operable to facilitate different reporting treatment for certain join requests received during a fast channel change. A gateway device may automatically detect the FCC (Fast Channel Change) via a configured interval. The gateway device may be configured such that if a subsequent IGMP (Internet group management protocol) join request was received within the configured interval since a previous join request, the previous join request may be ignored. According to the configuration of the gateway device, in a FCC, only the first channel and the last channel are reported, and the middle channel changes may be ignored.

20 Claims, 6 Drawing Sheets

CHANNEL REPORTING DURING FAST CHANNEL CHANGE

CROSS REFERENCE TO RELATED APPLICATION

This application is a continuation application of patent application Ser. No. 16/826,620 entitled "Channel Reporting During Fast Channel Change" filed in the United States Patent and Trademark Office on Mar. 23, 2020, claiming the benefit of U.S. Provisional Application Ser. No. 62/822,007, entitled "Wi-Fi Quality of Service over DOCSIS Network," which was filed on Mar. 21, 2019, which are incorporated herein by reference in their entirety.

TECHNICAL FIELD

This disclosure relates to channel reporting during fast channel change.

BACKGROUND

When an end user does a FCC (Fast Channel Change) on a television remote control unit, the remote control unit join/leave multicast groups very often (about 300 ms for each group). When the FCC stops, the end-user has to wait for some time (e.g., ten or more seconds, several seconds, etc.) before the television receives signal/traffic from the last channel in the FCC.

Therefore, it is desirable to improve upon methods and systems for carrying out a FCC.

BRIEF DESCRIPTION OF THE DRAWINGS

Like reference numbers and designations in the various drawings indicate like elements.

DETAILED DESCRIPTION

It is desirable to improve upon methods and systems for carrying out a FCC. Methods, systems, and computer readable media described herein can be operable to facilitate different reporting treatment for certain join requests received during a fast channel change. A gateway device may automatically detect the FCC (Fast Channel Change) via a configured interval. The gateway device may be configured such that if a subsequent IGMP (Internet group management protocol) join request was received within the configured interval since a previous join request, the previous join request may be ignored. According to the configuration of the gateway device, in a FCC, only the first channel and the last channel are reported, and the middle channel changes may be ignored.

Figure 1:
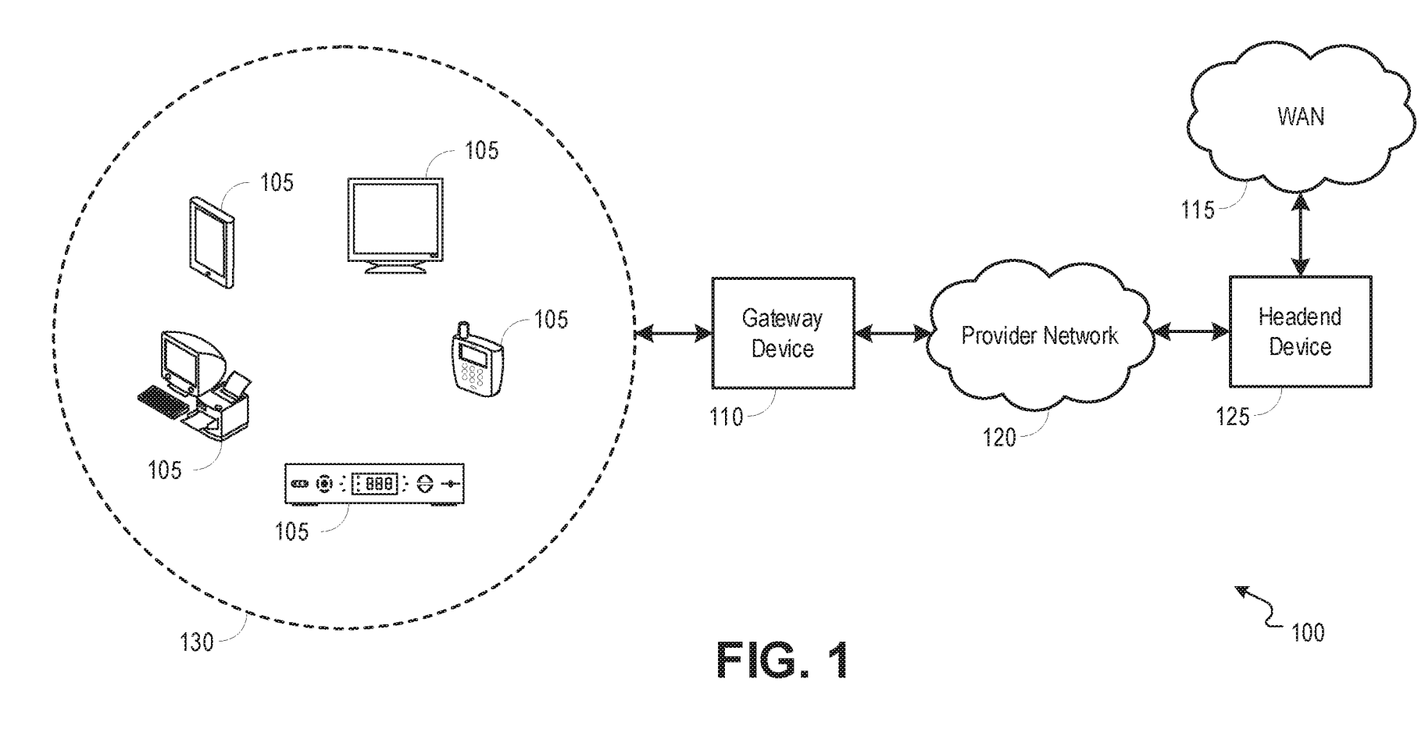
FIG. 1 is a block diagram illustrating an example network environment operable to facilitate different reporting treatment for certain join requests received during a fast channel change.

FIG. 1 is a block diagram illustrating an example network environment 100 operable to facilitate different reporting treatment for certain join requests received during a fast channel change. In embodiments, video, voice, and/or data services may be delivered to one or more client devices 105. Client devices 105 may include televisions, mobile devices, tablets, computers, set-top boxes (STB), telephones, gaming devices, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others.

In embodiments, one or more services delivered to a subscriber premises may be received and forwarded to one or more client devices 105 by a gateway device 110 (e.g., residential gateway, multimedia gateway, etc.). It should be understood that the devices shown in FIG. 1 may be integrated. For example, a client device 105 such as a television may be connected to a STB, and a user interface may be received from a STB and displayed to a user through a connected display device.

In embodiments, multiple services (e.g., video, voice, and/or data services) may be delivered from a wide-area network (WAN) 115 to a gateway device 110 through a connection between the gateway device 110 and a provider network 120. The provider network 120 may include an optical network, hybrid fiber coaxial (HFC) network, digital subscriber line (DSL) network, twisted-pair, mobile network, high-speed data network, MoCA network, and others. Multiple systems operator (MSO) or service provider devices and/or networks within the WAN 115 may be used to provide, manage, and/or troubleshoot the multiple services provided to subscribers. In embodiments, a client device 105 may receive one or more services from the gateway device 110. For example, Internet protocol television (IPTV) content or any other streaming content may be streamed from the gateway device 110 to a client device 105 for output to an associated display device (e.g., television). The delivery of services from the WAN 115 to a gateway device 110 may be facilitated by a headend device 125 (e.g., CMTS).

In embodiments, multiple services may be delivered from the gateway device 110 to one or more client devices 105 through a local network 130. The local network may include a local area network (LAN), wireless local area network (WLAN), personal area network (PAN), Multimedia over Coax Alliance (MoCA) network, mobile hotspot network, and others. The local network may be provided at a subscriber premises by the gateway device 110 or one or more other access points within the premises. It will be appreciated by those skilled in the relevant art that delivery of the multiple services over the local network may be accomplished using a variety of standards and formats.

In embodiments, logic may be implemented on a CPE (customer premise equipment) device (e.g., a gateway device (GW) 110) to automatically detect a FCC (Fast Channel Change) via a configured interval (e.g., 500 ms or other predetermined duration). The CPE device may be configured such that if a subsequent IGMP (Internet group management protocol) JOIN (join request) was received within the configured interval since previous JOIN, the previous JOIN may be ignored. Thus, according to the configuration of the CPE device, in a FCC, only the first channel and the last channel are reported, and the middle channel changes may be ignored. With this logic implemented on the CPE device, the delay from the initiation of the FCC to a moment at which downstream traffic is received by the CPE device is reduced in comparison to a FCC running on a CPE device without this logic being implemented.

In embodiments, the FCC detection may be based on a per client database. For example, a map may be used to store this database. There may be, for example, 254 clients for each subnet. In embodiments, the last byte of the client's dotted decimal IP (Internet protocol) address may be used as the hash key of the map.

In embodiments, the logic may be located in an IGMP proxy, which acts as a proxy serving to LAN side IGMP. JOINs may be ignored by the proxy (e.g., igmpproxy) and will not be forwarded or otherwise reach a controller. For example, a controller may be a CMTS (cable modem termination system) (e.g., the headend device 125) or multicast routing module of the gateway device 110. LEAVEs (leave request) may be handled normally. FCC detection only affects JOIN reports.

Without FCC detection, middle channel changes (e.g., those channel changes occurring between the initiation of the FCC and the end of the FCC) are not ignored during FCC. The last channel of a FCC then has to wait until all previous JOIN/LEAVE (s) have been processed by CMTS/Model interaction since an IGMP JOIN involves several DOCSIS message interactions, such as DBC (Dynamic Bonding Change). With FCC detection, waiting time of the last channel during FCC is minimized, no matter how fast the FCC is done or how long the FCC is continuously carried out.

In embodiments, when the gateway device 110 receives an IGMP JOIN, the gateway device 110 may determine whether this JOIN is the first JOIN from the client device 105 from which the JOIN is received. If the received JOIN is the first JOIN received from the client device 105, a timestamp (e.g., last_join timestamp) may be updated for the client device 105 and a group parameter (e.g., last_group) may be recorded for the client device 105. A standard process according to RFC may be carried out (e.g., the gateway device 110 may report the join request to the headend device 125).

If the received JOIN is not the first JOIN received from the client device 105, the gateway device 110 may determine whether a previous JOIN from the client device 105 has expired. For example, the gateway device 110 may compare a last_join timestamp to a now/current timestamp. If the previous JOIN from the client device 105 has expired (e.g., the difference between the timestamps is greater than a threshold), a last_join timestamp may be updated for the client device 105 and a last_group may be recorded for the client device 105. A standard process according to RFC may be carried out (e.g., the gateway device 110 may report the join request to the headend device 125).

If the previous JOIN from the client device has not expired (e.g., the difference between the timestamps is less than a threshold), the gateway device 110 may determine whether the current group is the same as a last_group. If the current group is the same as the last_group, the process can end. If the current group is not the same as the last_group, the following steps may be carried out for the current client: update last_join timestamp; record last_group; mark current group as "queued"; restart the FCC detection timer and save necessary info about current group.

When an FCC detection timer expires with saved group info, a determination may be made whether the group exists in a group list. If the group does not exist in a group list, the process may end. If the group does exist in a group list, a determination may be made whether the group is marked as "queued." If the group is not marked as "queued," the process may end. If the group is marked as "queued," the queued JOIN may be processed according to RFC, as if the JOIN was just received from the client (without FCC detection).

Figure 2:
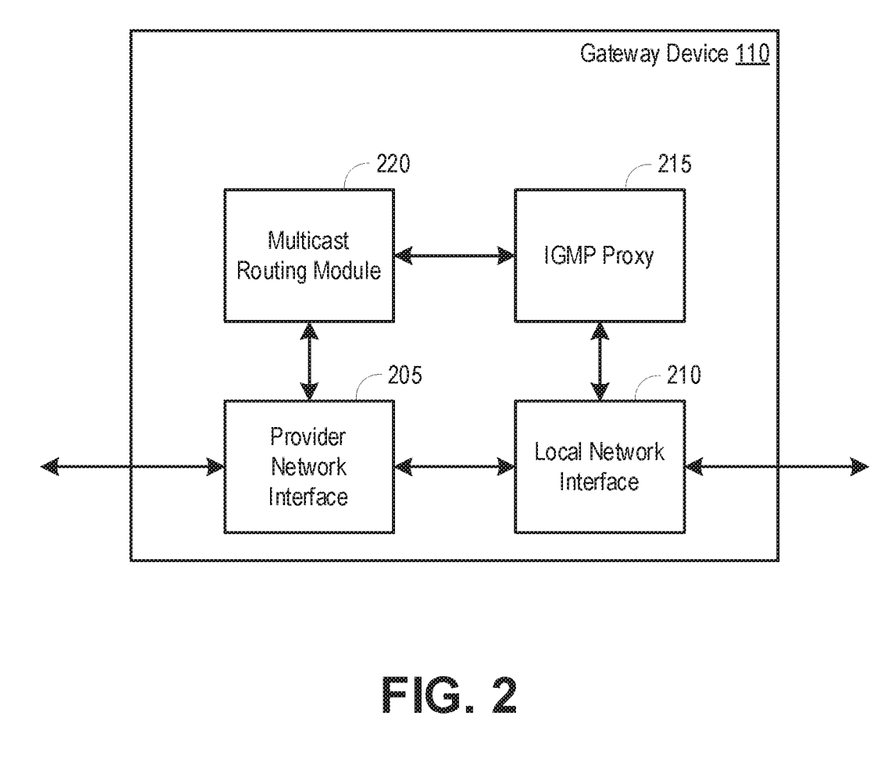
FIG. 2 is a block diagram illustrating an example gateway device operable to facilitate different reporting treatment for certain join requests received during a fast channel change.

FIG. 2 is a block diagram illustrating an example gateway device 110 operable to facilitate different reporting treatment for certain join requests received during a fast channel change. The gateway device 110 may include a provider network interface 205, a local network interface 210, an IGMP proxy 215, and a multicast routing module 220. The gateway device 110 may receive media, data, and other services, and may otherwise communicate with a headend device 125 of FIG. 1 through the provider network interface 205. The gateway device 110 may communicate over a local network (e.g., local network 130 of FIG. 1) with one or more client devices 105 of FIG. 1 via the local network interface 210.

In embodiments, the IGMP proxy may automatically detect a FCC (Fast Channel Change) via a configured interval (e.g., 500 ms or other predetermined duration). The IGMP proxy 215 may be configured such that if a subsequent IGMP (Internet group management protocol) JOIN (join request) was received within the configured interval since previous JOIN, the previous JOIN may be ignored. Thus, in a FCC, only the first channel and the last channel are reported, and the middle channel changes may be ignored.

In embodiments, the IGMP proxy 215 may act as a proxy serving to LAN side IGMP. JOINs may be ignored by the IGMP proxy 215 (e.g., igmpproxy) and will not reach CMTS (cable modem termination system) (e.g., the headend device 125) or multicast routing module 220. LEAVEs (leave request) may be handled normally.

Figure 3:
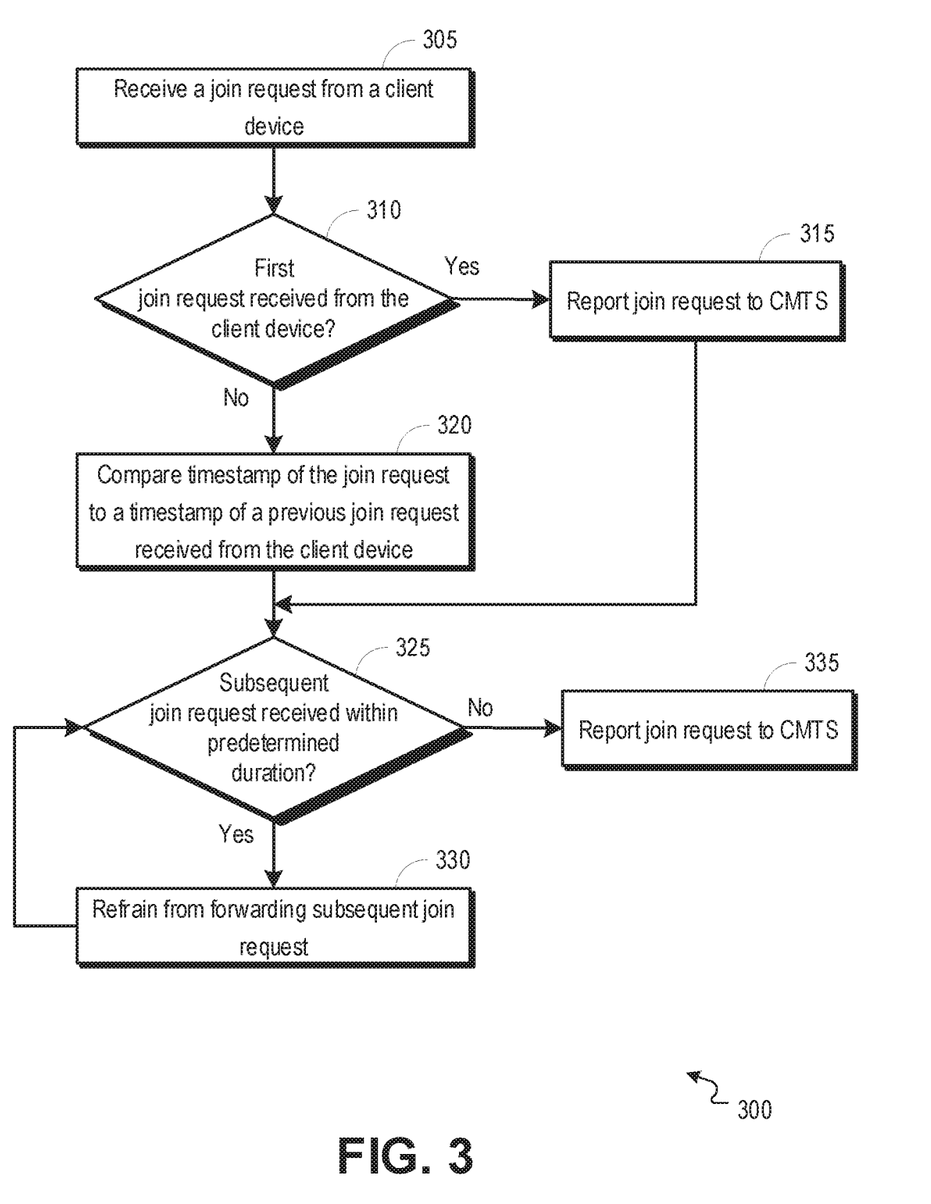
FIG. 3 is a flowchart illustrating an example process operable to facilitate a withholding of join requests associated with middle joins occurring during a fast channel change.

FIG. 3 is a flowchart illustrating an example process 300 operable to facilitate a withholding of join requests associated with middle joins occurring during a fast channel change. The process 300 may be carried out by a gateway device 110 of FIG. 1. The process 300 can begin at 305, when a join request (e.g., IGMP join request) is received from a client device (e.g., client device 105 of FIG. 1). The join request may be received by the gateway device 110 and may be recognized by an IGMP proxy (e.g., IGMP proxy 215 of FIG. 2). The join request may include an identification of the client device 105 from which it is received and an identification of a specific multicast group that the client device 105 is requesting to join.

At 310, a determination may be made whether the join request is the first join request received from the client device. If the determination is made that the join request is the first join request received from the client device, the join request may be reported to a headend device 125 of FIG. 1 (e.g., CMTS) at 315.

If, at 310, the determination is made that the join request is not the first join request received from the client device, the process 300 may proceed to 320. At 320, a timestamp of the join request may be compared to a timestamp of a previous join request received from the client device.

At 325, a determination may be made whether a subsequent join request is received within a predetermined duration from a previous join request being received. In embodiments, the IGMP proxy 215 may determine whether the subsequent join request is received within a certain duration from the prior join request being received, wherein the certain duration is a duration designated for identification of a fast channel change (e.g., 500 ms, etc.). The determination may be made through a comparison of a timestamp associated with the current join request and a timestamp associated with the prior join request.

If, at 325, the determination is made that the subsequent join request is received within a predetermined duration from the prior join request being received, the process 300 may proceed to 330. At 330, the IGMP proxy 215 may refrain from forwarding the subsequent join request. For example, the IGMP proxy 215 may refrain from reporting the subsequent join request to the headend device 125 (e.g., CMTS) and/or may refrain from reporting the subsequent join request to a multicast routing module of the gateway device 110.

Figure 4:
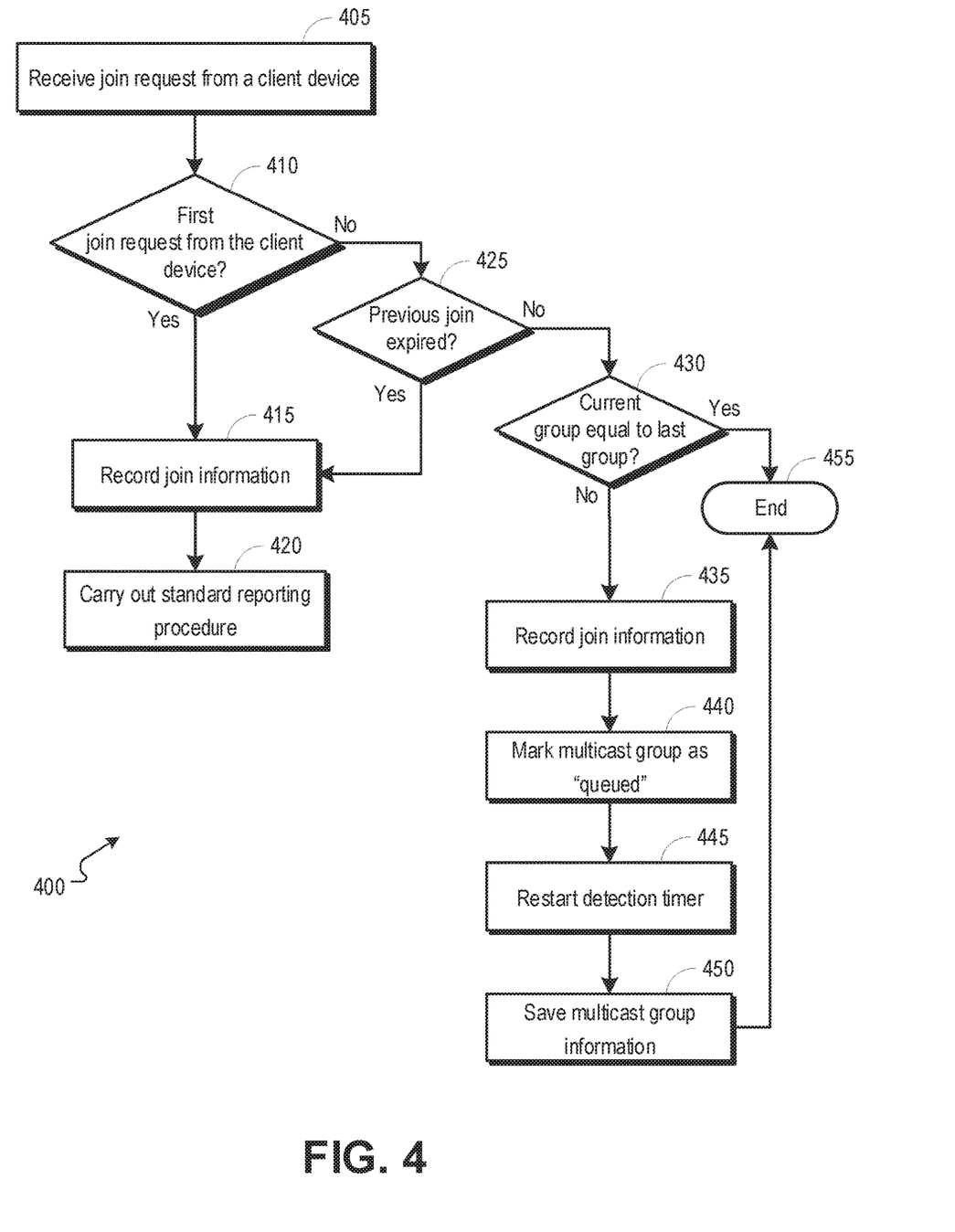
FIG. 4 is a flowchart illustrating an example process operable to respond to a received join request.

FIG. 4 is a flowchart illustrating an example process 400 operable to respond to a received join request. The process 400 may be carried out by a gateway device 110 of FIG. 1. The process 400 can begin at 405, when a join request (e.g., IGMP join request) is received from a client device (e.g., client device 105 of FIG. 1). The join request may be received by the gateway device 110 and may be recognized by an IGMP proxy (e.g., IGMP proxy 215 of FIG. 2).

At 410, a determination may be made whether the received join request is the first join request received from the client device. For example, the IGMP proxy 215 may check a database to determine whether the client device is associated with a previously received join request.

If, at 410, the determination is made that the received join request is the first join request received from the client device, the process 400 may proceed to 415. At 415, join information for the client device may be recorded. For example, the IGMP proxy 215 may update a last-join timestamp parameter for the client device by saving the join timestamp associated with the join request as the last join request received from the client device, and the IGMP proxy 215 may update a last-group parameter for the client device by saving the multicast group associated with the join request as the last multicast group joined by the client device.

At 420, the gateway device 110 may carry out a standard reporting procedure for reporting the received join request. For example, the IGMP proxy 215 may report the join request to a headend device 125 of FIG. 1 (e.g., CMTS) and/or may report the join request to a multicast routing module of the gateway device 110.

Returning to 410, if the determination is made that the received join request is not the first join request received from the client device, the process 400 may proceed to 425. At 425, a determination may be made whether a previous join request from the client device has expired. For example, the IGMP proxy 215 may determine whether a previous join request from the client device has expired by comparing a last-join timestamp associated with the client device to a current/now timestamp. If the difference between the last-join timestamp and the current/now timestamp is greater than a predetermined duration (e.g., a certain duration designated for identifying a fast channel change, such as 500 ms), the IGMP proxy 215 may determine that the previous join request has expired. If the determination is made that the previous join request has expired, the IGMP proxy 215 may record join information for the client device at 415, and the join request may be reported at 420.

If, at 425, the determination is made that the previous join request has not expired, the process 400 may proceed to 430. At 430, a determination may be made whether the current multicast group (i.e., the multicast group identified from the received join request) is the same group as a last multicast group joined by the client device. For example, the IGMP proxy 215 may compare the multicast group identified from the received join request to the last multicast group with which the client device is associated in a database.

If, at 430, the determination is made that the current multicast group is not the same group as the last multicast group joined by the client device, the process 400 may proceed to 435. At 435, join information for the client device may be recorded. For example, the IGMP proxy 215 may update a last-join timestamp parameter for the client device by saving the join timestamp associated with the join request as the last join request received from the client device, and the IGMP proxy 215 may update a last-group parameter for the client device by saving the multicast group associated with the join request as the last multicast group joined by the client device.

At 440, the multicast group may be marked as "queued." For example, the IGMP proxy 215 may designate the group as being updated.

At 445, a detection timer may be restarted. For example, the IGMP proxy 215 may cause an FCC detection timer to be restarted.

At 450, multicast group information may be saved. For example, the IGMP proxy 215 may cause current information associated with the specific multicast group to be saved and/or stored within a database.

Returning to 430, if the determination is made that the current multicast group is the same group as the last multicast group joined by the client device, the IGMP proxy 215 may determine that the received join request is a retransmitted join request, and the process 400 may end at 455.

Figure 5:
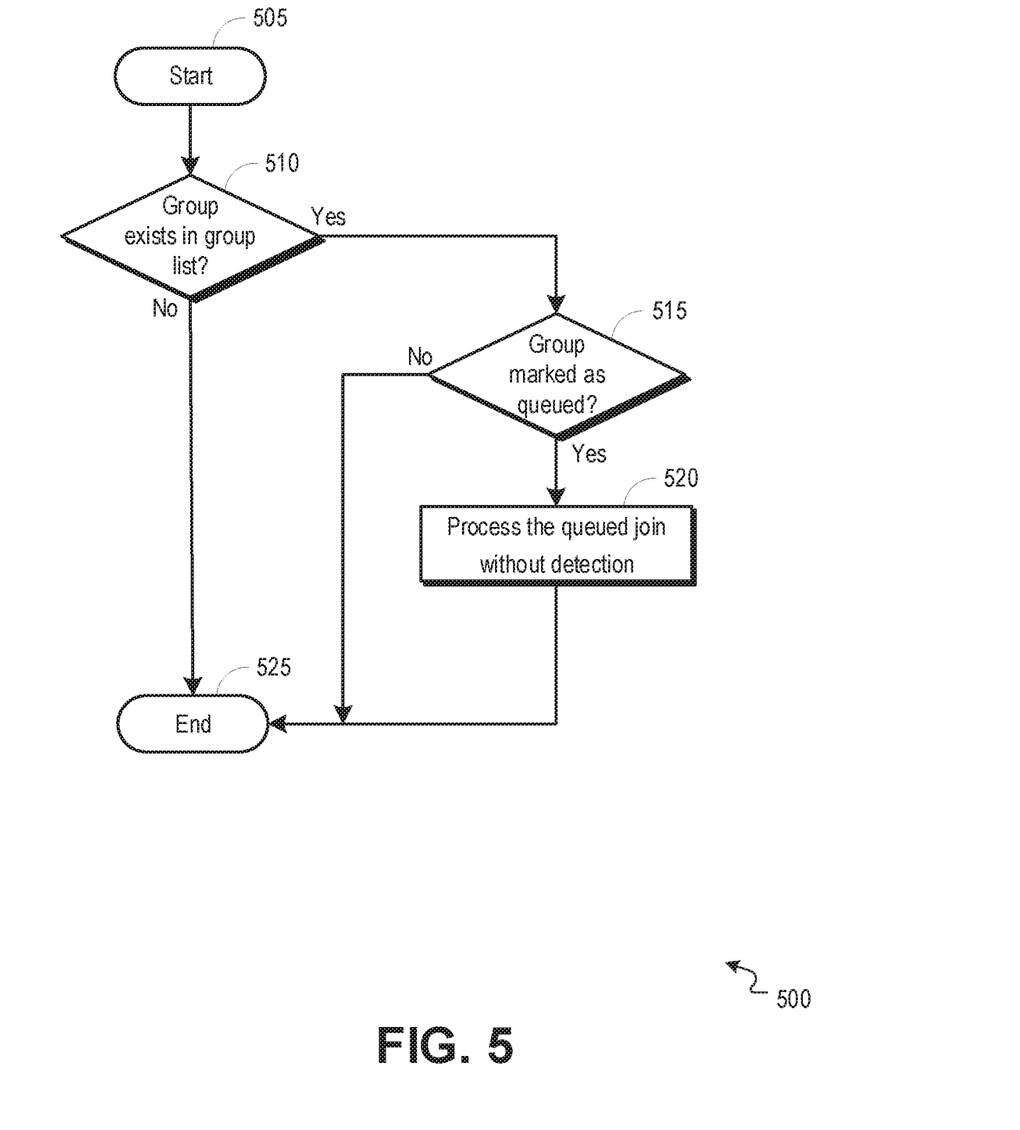
FIG. 5 is a flowchart illustrating an example process operable to respond to an expiration of a detection timer.

FIG. 5 is a flowchart illustrating an example process 500 operable to respond to an expiration of a detection timer. The process 500 may be carried out by a gateway device 110 of FIG. 1. The process 500 can begin at 505, when a detection timer (e.g., an FCC detection timer) expires with saved information of a multicast group.

At 510, a determination may be made whether the specific multicast group exists in a multicast group list. For example, an IGMP proxy 215 of FIG. 2 may check a database to determine whether the multicast group exists in a multicast group list.

If, at 510, the determination is made that the multicast group does exist in a multicast group list, the process 500 may proceed to 515. At 515, a determination may be made whether the multicast group is marked as "queued," or some similar marking.

If, at 515, the determination is made that the multicast group is marked as "queued," the determination may be made that the join has been delayed, and the queued join may be processed at 520. The queued join may be processed without detection (e.g., FCC detection).

If, at 515, the determination is made that the multicast group is not marked as "queued," the determination may be made that the group is not the multicast group that was queued, and the process 500 may end at 525.

Returning to 510, if the determination is made that the multicast group does not exist in a multicast group list, the determination may be made that the client device has left the multicast group, and the process 500 may end at 525.

Figure 6:
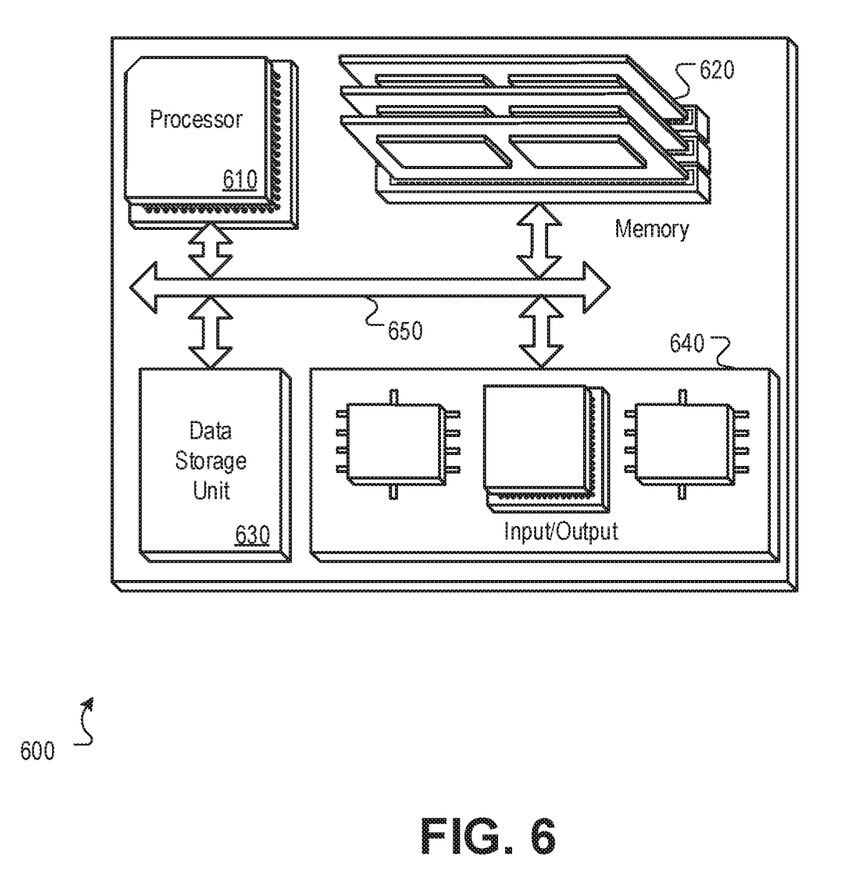
FIG. 6 is a block diagram of a hardware configuration operable to facilitate different reporting treatment for certain join requests received during a fast channel change.

FIG. 6 is a block diagram of a hardware configuration 600 operable to facilitate different reporting treatment for certain join requests received during a fast channel change. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, STB, computer, mobile device, tablet, etc.) or display device associated with a client device 105. In another implementation, the input/output device can include driver devices configured to send communications to, and receive communications from one or more networks (e.g., WAN 115 of FIG. 1, provider network 120 of FIG. 1, local network 130 of FIG. 1, etc.).

Those skilled in the art will appreciate that the invention improves upon methods and systems for carrying out a FCC. Methods, systems, and computer readable media described herein can be operable to facilitate different reporting treatment for certain join requests received during a fast channel change. A gateway device may automatically detect the FCC (Fast Channel Change) via a configured interval. The gateway device may be configured such that if a subsequent IGMP (Internet group management protocol) join request was received within the configured interval since a previous join request, the previous join request may be ignored. According to the configuration of the gateway device, in a FCC, only the first channel and the last channel are reported, and the middle channel changes may be ignored.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    receiving, at a gateway device from a client device, during a fast channel change a subsequent Internet group management protocol join ("join request") for switching to a second channel associated with a second multicast group Internet protocol (IP) address after a prior join request for switching to a first channel associated with a first multicast group IP address that was reported to a controller;
    determining whether the subsequent join request is received at the gateway device within a predetermined duration after the prior join request was received at the gateway device, the predetermined duration designated for identifying the fast channel change;
    refraining from forwarding the subsequent join request to the controller when the subsequent join request is determined to have been received within a predetermined duration after the prior join request was received to prevent the switching to a channel associated with the subsequent join request; and
    forwarding the subsequent join request to the controller for execution when the subsequent join request is determined to have not been received within the predetermined duration after the prior join request was received to switch to the channel associated with the subsequent join request.

2. The method of claim 1, wherein the subsequent join request includes an identification of the client device from which the join request is received and an identification of a specific multicast group associated with a switch to a channel requested by the client device.

3. The method of claim 1, wherein the determining whether the subsequent join request is received at the gateway device within the predetermined duration after the prior join request was received at the gateway device is made by comparing a timestamp associated with the prior join request and a timestamp associated with the subsequent join request.

4. The method of claim 1, wherein the controller comprises a cable modem termination system.

5. The method of claim 1, wherein the controller comprises a multicast routing module at the gateway device.

6. The method of claim 1, further comprising:
    recording the timestamp associated with the subsequent join request as a timestamp for a last join timestamp parameter when the determination is made that the subsequent join request was not received at the gateway device within the predetermined duration after the first join request was received at the gateway device.

7. The method of claim 1, further comprising:
    restarting a fast channel change detection timer for determining the predetermined duration when the determination is made that the subsequent join request was received at the gateway device within the predetermined duration after the prior join request was received at the gateway device.

8. A gateway device, comprising:
    a memory storing computer-readable instructions; and
    a processor configured to execute the computer-readable instructions to:
        receive, from a client device, during a fast channel change a subsequent Internet group management protocol join ("join request") for switching to a second channel associated with a second multicast group Internet protocol (IP) address after a prior join request for switching to a first channel associated with a first multicast group IP address that was reported to a controller;
        determine whether the subsequent join request is received within a predetermined duration after the prior join request was received, the predetermined duration designated for identifying the fast channel change;
        refrain from forwarding the subsequent join request to the controller when the subsequent join request is determined to have been received within a predetermined duration after the prior join request was received to prevent the switching to a channel associated with the subsequent join request; and
        forward the subsequent join request to the controller for execution when the subsequent join request is determined to have not been received within the predetermined duration after the prior join request was received to switch to the channel associated with the subsequent join request.

9. The gateway of claim 8, wherein the subsequent join request includes an identification of the client device from which the join request is received and an identification of a specific multicast group associated with a switch to a channel requested by the client device.

10. The gateway of claim 8, wherein the processor is further configured to determine whether the subsequent join request is received at the gateway device within the predetermined duration after the prior join request was received at the gateway device by comparing a timestamp associated with the prior join request and a timestamp associated with the subsequent join request.

11. The gateway of claim 8, wherein the processor forwards the subsequent join request to a cable modem termination system.

12. The gateway of claim 8, further comprising a multicast routing module, wherein the processor forwards the subsequent join request to the multicast routing module.

13. The gateway of claim 8, wherein the processor records the timestamp associated with the subsequent join request as a timestamp for a last join timestamp parameter when the processor determines that the subsequent join request was not received within the predetermined duration after the first join request was received.

14. One or more non-transitory computer readable media having instructions operable to cause one or more processors to perform the operations comprising:

receiving, at a gateway device from a client device, during a fast channel change a subsequent Internet group management protocol join ("join request") for switching to a second channel associated with a second multicast group Internet protocol (IP) address after a prior join request for switching to a first channel associated with a first multicast group IP address that was reported to a controller;

determining whether the subsequent join request is received at the gateway device within a predetermined duration after the prior join request was received at the gateway device, the predetermined duration designated for identifying the fast channel change;

refraining from forwarding the subsequent join request to the controller when the subsequent join request is determined to have been received within a predetermined duration after the prior join request was received to prevent the switching to a channel associated with the subsequent join request; and forwarding the subsequent join request to the controller for execution when the subsequent join request is determined to have not been received within the predetermined duration after the prior join request was received to switch to the channel associated with the subsequent join request.

15. The non-transitory computer readable media of claim 14, wherein the subsequent join request includes an identification of the client device from which the join request is received and an identification of a specific multicast group associated with a switch to a channel requested by the client device.

16. The non-transitory computer readable media of claim 14, wherein the determining whether the subsequent join request is received at the gateway device within the predetermined duration after the prior join request was received at the gateway device is made by comparing a timestamp associated with the prior join request and a timestamp associated with the subsequent join request.

17. The non-transitory computer readable media of claim 14, wherein the controller comprises a cable modem termination system.

18. The non-transitory computer readable media of claim 14, wherein the controller comprises a multicast routing module at the gateway device.

19. The non-transitory computer readable media of claim 14, further comprising:

recording the timestamp associated with the subsequent join request as a timestamp for a last join timestamp parameter when the determination is made that the subsequent join request was not received at the gateway device within the predetermined duration after the first join request was received at the gateway device.

20. Non-transitory computer readable media of claim 14, further comprising:

restarting a fast channel change detection timer for determining the predetermined duration when the determination is made that the subsequent join request was received at the gateway device within the predetermined duration after the prior join request was received at the gateway device.

* * * * *